United States Patent
Kibo et al.

(10) Patent No.: US 8,966,919 B2
(45) Date of Patent: Mar. 3, 2015

(54) AIR CONDITIONING APPARATUS HAVING HEAT-SOURCE-SIDE EXPANSION VALVE CONTROL

(75) Inventors: Kousuke Kibo, Sakai (JP); Shinichi Kasahara, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/812,762

(22) PCT Filed: Jul. 21, 2011

(86) PCT No.: PCT/JP2011/066533
§ 371 (c)(1),
(2), (4) Date: Jan. 28, 2013

(87) PCT Pub. No.: WO2012/017829
PCT Pub. Date: Feb. 9, 2012

(65) Prior Publication Data
US 2013/0118197 A1    May 16, 2013

(30) Foreign Application Priority Data
Aug. 2, 2010  (JP) ................ 2010-173612

(51) Int. Cl.
| | |
|---|---|
| F25B 41/04 | (2006.01) |
| F25B 49/02 | (2006.01) |
| F25B 1/00 | (2006.01) |
| F25B 13/00 | (2006.01) |
| F25B 41/06 | (2006.01) |

(52) U.S. Cl.
CPC . *F25B 49/02* (2013.01); *F25B 1/00* (2013.01); *F25B 13/00* (2013.01); *F25B 41/062* (2013.01); *F25B 2313/005* (2013.01); *F25B 2313/0233* (2013.01); *F25B 2313/02741* (2013.01); *F25B 2600/2513* (2013.01)
USPC ............................................... 62/222; 62/216

(58) Field of Classification Search
CPC ............................................... F25B 2600/2513
USPC ........................................... 62/216, 222, 225
See application file for complete search history.

(56) References Cited

U.S. PATENT DOCUMENTS

| | | | |
|---|---|---|---|
| 6,182,456 B1 | 2/2001 | Yamaguchi et al. | |
| 2009/0229285 A1* | 9/2009 | Sato et al. ................. | 62/149 |
| 2010/0024454 A1 | 2/2010 | Kawano et al. | |

FOREIGN PATENT DOCUMENTS

| | | |
|---|---|---|
| EP | 1304532 A | 4/2003 |
| EP | 1 655 553 A2 | 5/2006 |
| EP | 1830141 A | 9/2007 |

(Continued)

OTHER PUBLICATIONS

JP 2008-185292 (english translation).*

(Continued)

*Primary Examiner* — Jonathan Bradford
(74) *Attorney, Agent, or Firm* — Global IP Counselors

(57) ABSTRACT

An air conditioning apparatus includes a heat source unit, usage units, and a controller. The heat source unit has a compression mechanism, a heat-source-side heat exchanger operable at least as an evaporator, and a heat-source-side expansion valve. The usage units have usage-side heat exchangers operable at least as condensers, and usage-side expansion valves. The controller regulates the opening degree of the heat-source-side expansion valve based on the opening degrees of the usage-side expansion valves.

15 Claims, 3 Drawing Sheets

(56) References Cited

FOREIGN PATENT DOCUMENTS

| | | | |
|---|---|---|---|
| EP | 1830142 | A | 9/2007 |
| EP | 1832820 | A | 9/2007 |
| JP | 2-126044 | A | 5/1990 |
| JP | 8-247565 | A | 9/1996 |
| JP | 9-210491 | A | 8/1997 |
| JP | 11-304268 | A | 11/1999 |
| JP | 2002-39642 | A | 2/2002 |
| JP | 2000-146261 | A | 5/2005 |
| JP | 2008-185292 | A | 8/2008 |

OTHER PUBLICATIONS

International Search Report of corresponding EP Application No. PCT/JP2011/066533.

European Search Report of corresponding EP Application No. 11 81 4459.1 dateed Dec. 11, 2013.

International Preliminary Report of corresponding PCT Application No. PCT/JP2011/066533.

* cited by examiner

AIR CONDITIONING APPARATUS HAVING HEAT-SOURCE-SIDE EXPANSION VALVE CONTROL

CROSS-REFERENCE TO RELATED APPLICATIONS

This U.S. National stage application claims priority under 35 U.S.C. §119(a) to Japanese Patent Application Nos. 2010-173612, filed in Japan on Aug. 2, 2010, the entire contents of which are hereby incorporated herein by reference.

TECHNICAL FIELD

The present invention relates to an air conditioning apparatus.

BACKGROUND ART

In conventional practice, there have been air conditioning apparatuses having a refrigerant circuit in which two expansion valves are connected in series, as shown in Japanese Laid-open Patent Application No. 2002-39642. In this air conditioning apparatus, an outdoor expansion valve is disposed in an outdoor unit, an indoor expansion valve is disposed in an indoor unit, and these valves are connected, thereby forming a refrigerant circuit in which two expansion valves are connected in series.

SUMMARY

Technical Problem

In this type of conventional air conditioning apparatus, the outdoor expansion valve and the indoor expansion valve are separately controlled to reach target values, and the degree of depressurization in the refrigeration cycle is established by the total amount of depressurization achieved by the outdoor expansion valve and the indoor expansion valve together. Therefore, when the outdoor expansion valve and the indoor expansion valve are controlled separately, sometimes the amount of depressurization by the outdoor expansion valve is large and the amount of depressurization by the indoor expansion valve is small even if the pressure reduced in total reaches the target value.

In such cases, the refrigerant in a liquid refrigerant communication tube flowing from the indoor unit to the outdoor unit readily goes into a gas-liquid two-phase state, particularly during an air-warming operation. Moreover, the quality of wet vapor of the refrigerant in the liquid refrigerant communication tube changes greatly depending on the operating state. Such factors inhibit the interior of the liquid refrigerant communication tube being from filled with liquid refrigerant, resulting in a surplus of refrigerant because the refrigerant quantity is selected based on the air-cooling operation which requires a greater refrigerant quantity than the air-warming operation. Therefore, there is much refrigerant that cannot be evaporated in the evaporator, and in cases in which the accumulator is small and/or there seems to be an overfill of refrigerant, there is a risk of the accumulator overflowing and causing wet compression.

In a multi system in which a plurality of indoor units are connected to a single outdoor unit, the opening degree of the indoor expansion valve is not fully closed but set to slightly open in order to prevent the liquid refrigerant from accumulating in the indoor heat exchanger during the thermo-off state. With such an air conditioning apparatus, in a case such that the heat load of one indoor unit is small and in a thermo-off state and the heat load of another indoor unit is large, when the amount of depressurization by the outdoor expansion valve is extremely small, the opening degrees in all of the indoor expansion valves are small regardless of the heat load of the indoor units, in order to ensure the amount of depressurization. Therefore, even if the heat loads differ among the plurality of indoor units, it is difficult to create a difference in the opening degrees of the indoor expansion valves in accordance with the sizes of the heat loads of the indoor units. This is either because depending on the indoor expansion valve, there are variations in the relationship between opening degrees and amounts of depressurization of the indoor expansion valves due to individual differences in the indoor expansion valves, or because the sizes of the indoor expansion valves differ according to the sizes of the rated capacities of the indoor units, and when the opening degrees of the indoor expansion valves are extremely small or nearly so (hereinbelow referred to as a low opening degree state), it is difficult to accurately control the amounts of depressurization in the indoor expansion valves. In the low opening degree state, there is a large change in refrigerant flow rate per change in unit pulse opening degree, and it is therefore difficult to accurately control the amounts of depressurization, as is described above. Therefore, there are cases in which, as a result, much refrigerant flows through an indoor unit having a small heat load. Thus, there is a risk that it will not be possible to efficiently utilize energy.

An object of the present invention is to provide an air conditioning apparatus having two expansion valves connected in series, wherein a compressor can be protected and energy can be conserved.

Solution to Problem

An air conditioning apparatus according to a first aspect of the present invention comprises a heat source unit, usage units, and a controller. The heat source unit has a compression mechanism, a heat-source-side heat exchanger functioning at least as an evaporator, and a heat-source-side expansion valve. The usage units have usage-side heat exchangers functioning at least as condensers, and usage-side expansion valves. The controller regulates the opening degree of the heat-source-side expansion valve on the basis of the opening degrees of the usage-side expansion valves.

Therefore, it is possible to regulate the balance between the amount of depressurization by the heat-source-side expansion valve and the amounts of depressurization by the usage-side expansion valves. Therefore, surplus refrigerant can be prevented from occurring in the refrigerant circuit, and wet compression can be prevented from occurring in the compressor.

It is possible to regulate the balance between the amount of depressurization by the heat-source-side expansion valve and the amounts of depressurization by the usage-side expansion valves even when there are a plurality of usage units, for example. Therefore, the amount of depressurization by the heat-source-side expansion valve can be prevented from being extremely small, and it is easy to achieve a balance in the usage-side expansion valves between usage units having a small required load and usage units having a large required load. A ratio suitable for each required load can thereby be achieved between the refrigerant quantity flowing to usage units having a small required load and usage units having a large required load. An excessive quantity of refrigerant can thereby be prevented from flowing to usage units having a small required load, and energy can be conserved.

An air conditioning apparatus according to a second aspect of the present invention is the air conditioning apparatus according to the first aspect, wherein the heat source unit also has an accumulator on the intake side of the compression mechanism.

Therefore, even if a surplus of refrigerant is present in the refrigerant circuit, the refrigerant can be accumulated in the accumulator. Therefore, liquid compression can be prevented from occurring in the compression mechanism.

An air conditioning apparatus according to a third aspect of the present invention is the air conditioning apparatus according to the first or second aspect, wherein the controller regulates the opening degree of the usage-side expansion valves during an air-warming operation so that the degree of subcooling in the outlets of the usage-side heat exchangers reaches a degree of subcooling target value.

Thus, even if the controller is performing a control so as to regulate the opening degrees of the usage-side expansion valves during an air-warming operation so that the degrees of subcooling in the outlets of the usage-side heat exchangers reach a degree of subcooling target value, the opening degree of the heat-source-side expansion valve is regulated based on the opening degrees of the usage-side expansion valves, and it is therefore possible to regulate the balance between the amount of depressurization by the heat-source-side expansion valve and the amounts of depressurization by the usage-side expansion valves.

An air conditioning apparatus according to a fourth aspect of the present invention is the air conditioning apparatus according to the third aspect, wherein there are a plurality of the usage units. The controller sets the degree of subcooling target value for each of the usage units in accordance with the required load of each of the usage units.

Thus, even if there are a plurality of the usage units and the controller is performing a control so as to regulate the opening degrees of the usage-side expansion valves during an air-warming operation so that the degrees of subcooling in the outlets of the usage-side heat exchangers reach a degree of subcooling target value, it is possible to regulate the balance between the amount of depressurization by the heat-source-side expansion valve and the amounts of depressurization by the usage-side expansion valves. Therefore, the amount of depressurization by the heat-source-side expansion valve can be prevented from being extremely small, and it is easy to achieve a balance in the usage-side expansion valves between usage units having a small required load and usage units having a large required load. A ratio suitable for each required load can thereby be achieved between the refrigerant quantity flowing to usage units having a small required load and usage units having a large required load. An excessive quantity of refrigerant can thereby be prevented from flowing to usage units having a small required load, and energy can be conserved.

An air conditioning apparatus according to a fifth aspect of the present invention is the air conditioning apparatus according to the fourth aspect, wherein the controller regulates the usage-side expansion valves when the usage units are in a thermo-off state so that the valves are not fixed in the fully closed state and a flow of refrigerant is ensured.

In the air conditioning apparatus according to the fifth aspect, even if the controller is performing a control so as to regulate the usage-side expansion valves when the usage units are in the thermo-off state so that the valves are not fixed in the fully closed state and a flow of refrigerant is ensured, the balance is regulated between the amount of depressurization by the heat-source-side expansion valve and the amounts of depressurization by the usage-side expansion valves. The phrase "control for regulating the usage-side expansion valves so that the valves are not fixed in the fully closed state and a flow of refrigerant is ensured" used herein refers to control for regulating the usage-side expansion valves to extremely small opening degrees, control for repeatedly putting the usage-side expansion valves into the fully closed state and an open state intermittently, and/or the like, for example.

As described above, it is generally difficult to accurately control the amounts of depressurization in the usage-side expansion valves when the indoor expansion valves have low opening degrees. Even if the usage-side expansion valves are repeatedly alternated between the fully closed state and an open state by intermittent control, it is difficult to accurately control the amounts of depressurization in the usage-side expansion valves.

Therefore, even in cases in which the usage-side expansion valves have extremely small opening degrees and/or cases in which the usage-side expansion valves are repeatedly alternated between the fully closed state and an open state by intermittent control, wherein it is particularly difficult for the opening degrees of the usage-side expansion valves to accurately control the amounts of depressurization, the amount of depressurization by the heat-source-side expansion valve can be prevented from becoming extremely small, and it is possible to easily achieve a balance in the usage-side expansion valves between usage units in the thermo-off state having a small required load and usage units having a large required load. Therefore, a ratio suitable for each required load can be achieved between the refrigerant quantity flowing to usage units in the thermo-off state having a small required load and usage units having a large required load. An excessive quantity of refrigerant can thereby be prevented from flowing to usage units having a small required load, and energy can be conserved.

An air conditioning apparatus according to the sixth aspect of the present invention is the air conditioning apparatus according to the fourth or fifth aspect, wherein the controller regulates the opening degree of the heat-source-side expansion valve on the basis of a representative opening degree of the usage-side expansion valves of the usage units.

Therefore, the opening degree of the heat-source-side expansion valve can be regulated even when there are a plurality of usage units and a plurality of usage-side expansion valves.

An air conditioning apparatus according to the seventh aspect of the present invention is the air conditioning apparatus according to the sixth aspect, wherein the controller uses the maximum opening degree among the opening degrees of the usage-side expansion valves of the usage units as the representative opening degree.

Therefore, the opening degree of the heat-source-side expansion valve can be regulated even when there are a plurality of usage units and a plurality of usage-side expansion valves.

An air conditioning apparatus according to the eighth aspect of the present invention is the air conditioning apparatus according to the seventh aspect, wherein the controller corrects the opening degrees of the usage-side expansion valves for each of the usage units on the basis of the specifications of the usage unit to which the usage-side expansion valve belongs, and uses as the representative opening degree the maximum opening degree among the opening degrees of the usage-side expansion valves after the correction in the usage units.

Generally, when the usage units have different specifications, the amounts of depressurization relative to the opening degrees of the usage-side expansion valves are different. Specifically, there are cases in which the opening degrees of the usage-side expansion valves and amounts of depressurization by the usage-side expansion valves are not proportional. Therefore, when the heat-source-side expansion valve is regulated based only on the opening degrees of the usage-side expansion valves, there is a risk that the heat-source-side expansion valve will be regulated based on values different from the actual amounts of depressurization by the usage-side expansion valves.

In the air conditioning apparatus according to the eighth aspect, the controller corrects the opening degrees of the usage-side expansion valves of the plurality of usage units for each usage unit on the basis of the specifications of the usage unit to which the usage-side expansion valve belongs. The controller then uses as the representative opening degree the maximum opening degree among the opening degrees of the usage-side expansion valves after the correction. The term "specifications of the usage units" refers to a ratio between a specific flow rate based on the flow rate of refrigerant needed to achieve the rated capacity of the usage units under predetermined conditions, and the apertures of the usage-side expansion valves of the usage units.

Thus, because the opening degrees of the usage-side expansion valves are corrected based on the specifications of the usage units and the maximum opening degree among the opening degrees of the usage-side expansion valves after the correction is used as the representative opening degree, the representative opening degree and the actual amounts of depressurization by the usage-side expansion valves can be made to have a nearly proportional relationship. Therefore, even if the usage units have different specifications, the opening degree of the heat-source-side expansion valve can be adjusted based on a value close to the actual amounts of depressurization by the usage-side expansion valves, and the amount of depressurization by the heat-source-side expansion valve can be regulated more accurately.

An air conditioning apparatus according to the ninth aspect of the present invention is the air conditioning apparatus according to the seventh or eighth aspect, wherein the controller corrects the opening degrees of the usage-side expansion valves for each of the usage units on the basis of the installation conditions of the usage unit to which the usage-side expansion valve belongs, and uses as the representative opening degree the maximum opening degree among the opening degrees of the usage-side expansion valves after the correction in the usage units.

Generally, when a plurality of usage units are installed, the refrigerant communication tubes from the usage units to the heat source unit have different tube lengths and/or tube diameters, for example, in each usage unit. Specifically, the pressure loss in the refrigerant communication tube differs in each usage unit.

In the air conditioning apparatus according to the ninth aspect, the controller corrects the opening degrees of the usage-side expansion valves of the plurality of usage units for each usage unit on the basis of the installation conditions of the usage unit to which the usage-side expansion valve belongs. The controller then uses as the representative opening degree the maximum opening degree among the opening degrees of the usage-side expansion valves after the correction. The term "installation conditions of the usage units" refers to the tube lengths and tube diameters of the refrigerant communication tubes from the heat source unit (or from beyond the branching point of the refrigerant communication tubes) to the usage units.

Thus, because the opening degrees of the usage-side expansion valves are corrected based on the installation conditions of the usage units and the maximum opening degree among the opening degrees of the usage-side expansion valves after the correction is used as the representative opening degree, the representative opening degree and the actual amounts of depressurization by the usage-side expansion valves can be made to have a nearly proportional relationship. Therefore, even if the usage units have different installation conditions, the opening degree of the heat-source-side expansion valve can be adjusted based on a value close to the actual amounts of depressurization by the usage-side expansion valves, and the amount of depressurization by the heat-source-side expansion valve can be regulated more accurately.

An air conditioning apparatus according to a tenth aspect of the present invention is the air conditioning apparatus according to the sixth aspect, wherein the controller uses the average opening degree of the usage-side expansion valves of the usage units as the representative opening degree.

Therefore, the opening degree of the heat-source-side expansion valve can be regulated even when there are a plurality of usage units and a plurality of usage-side expansion valves.

An air conditioning apparatus according to an eleventh aspect of the present invention is the air conditioning apparatus according to any of the sixth through tenth aspects, wherein the controller regulates the opening degree of the heat-source-side expansion valve so that the representative opening degree approaches a predetermined opening degree.

Thus, by setting the opening degrees of the usage-side expansion valves to a predetermined opening degree in advance, the balance between the amounts of depressurization by the usage-side expansion valves and the amount of depressurization by the heat-source-side expansion valve can be set to an optimum.

An air conditioning apparatus according to a twelfth aspect of the present invention is the air conditioning apparatus according to any of the first through eleventh aspects, wherein the controller causes the target value of the opening degrees of the usage-side expansion valves to fluctuate in accordance with a system refrigerant quantity state estimated from the operating state, the target value being a reference for regulating the opening degree of the heat-source-side expansion valve.

In the air conditioning apparatus according to the twelfth aspect, the controller causes the target value of the opening degrees of the usage-side expansion valves to fluctuate in accordance with whether the state of the system refrigerant quantity, which is the refrigerant quantity in the refrigerant circuit, is in a tendency of a surplus or a tendency of an insufficiency in the refrigerant circuit, for example, the target value being a reference for regulating the opening degree of the heat-source-side expansion valve. For example, if the state of the refrigerant quantity in the refrigerant circuit is a tendency of a surplus, the response is to increase the target value of the opening degrees of the usage-side expansion valves being referenced, and if the state of the refrigerant quantity in the refrigerant circuit is a tendency of an insufficiency, the response is to reduce the target value of the opening degrees of the usage-side expansion valves being referenced.

Therefore, when the state of the refrigerant quantity in the refrigerant circuit is in a tendency of a surplus, the refrigerant in the liquid refrigerant communication tube can be put into a highly dense liquid state. Therefore, the quantity of refrigerant retained in the liquid refrigerant communication tube can be increased as much as possible, and operation is possible even when there is a surplus of refrigerant.

When the state of the refrigerant quantity in the refrigerant circuit is in a tendency of an insufficiency, the refrigerant in the liquid refrigerant communication tube can be put into a gas-liquid two-phase state of low density. Therefore, the quantity of refrigerant retained in the liquid refrigerant communication tube can be reduced, the reduced amount can be retained in the usage-side heat exchangers, and operation is possible even when the refrigerant is insufficient.

Advantageous Effects of Invention

In the air conditioning apparatus according to the first aspect of the present invention, it is possible to regulate the balance between the amount of depressurization by the heat-source-side expansion valve and the amounts of depressurization by the usage-side expansion valves. Therefore, a surplus of refrigerant can be prevented from occurring in the refrigerant circuit, and wet compression can be prevented from occurring in the compressor.

In the air conditioning apparatus according to the second aspect of the present invention, even if a surplus of refrigerant is present in the refrigerant circuit, the refrigerant can be accumulated in the accumulator. Therefore, liquid compression can be prevented from occurring in the compression mechanism.

In the air conditioning apparatus according to the third aspect of the present invention, even if the controller is performing a control so as to regulate the opening degrees of the usage-side expansion valves during an air-warming operation so that the degrees of subcooling in the outlets of the usage-side heat exchangers reach a degree of subcooling target value, the opening degree of the heat-source-side expansion valve is regulated based on the opening degrees of the usage-side expansion valves, and it is therefore possible to regulate the balance between the amount of depressurization by the heat-source-side expansion valve and the amounts of depressurization by the usage-side expansion valves.

In the air conditioning apparatus according to the fourth aspect of the present invention, it is possible to regulate the balance between the amount of depressurization by the heat-source-side expansion valve and the amounts of depressurization by the usage-side expansion valves. Therefore, the amount of depressurization by the heat-source-side expansion valve can be prevented from being extremely small, and it is easy to achieve a balance in the usage-side expansion valves between usage units having a small required load and usage units having a large required load. Therefore, a ratio suitable for each required load can be achieved between the refrigerant quantity flowing to usage units having a small required load and usage units having a large required load. An excessive quantity of refrigerant can thereby be prevented from flowing to usage units having a small required load, and energy can be conserved.

In the air conditioning apparatus according to the fifth aspect of the present invention, even in cases in which the usage-side expansion valves have extremely small opening degrees and/or cases in which the usage-side expansion valves are repeatedly alternated between the fully closed state and an open state by intermittent control, wherein it is particularly difficult for the opening degrees of the usage-side expansion valves to accurately control the amounts of depressurization, the amount of depressurization by the heat-source-side expansion valve can be prevented from becoming extremely small, and it is possible to easily achieve a balance in the usage-side expansion valves between usage units in the thermo-off state having a small required load and usage units having a large required load. Therefore, a ratio suitable for each required load can be achieved between the refrigerant quantity flowing to usage units in the thermo-off state having a small required load and usage units having a large required load. An excessive quantity of refrigerant can thereby be prevented from flowing to usage units having a small required load, and energy can be conserved.

In the air conditioning apparatus according to the sixth aspect of the present invention, the opening degree of the heat-source-side expansion valve can be regulated even when there ure a plurality of usage units and a plurality of usage-side expansion valves.

In the air conditioning apparatus according to the seventh aspect of the present invention, the opening degree of the heat-source-side expansion valve can be regulated even when there ure a plurality of usage units and a plurality of usage-side expansion valves.

In the air conditioning apparatus according to the eighth aspect of the present invention, because the opening degrees of the usage-side expansion valves are corrected based on the specifications of the usage units and the maximum opening degree among the opening degrees of the usage-side expansion valves after the correction is used as the representative opening degree, the representative opening degree and the actual amounts of depressurization by the usage-side expansion valves can be made to have a nearly proportional relationship. Therefore, even if the usage units have different specifications, the opening degree of the heat-source-side expansion valve can be adjusted based on a value close to the actual amounts of depressurization by the usage-side expansion valves, and the amount of depressurization by the heat-source-side expansion valve can be regulated more accurately.

In the air conditioning apparatus according to the ninth aspect of the present invention, because the opening degrees of the usage-side expansion valves are corrected based on the installation conditions of the usage units and the maximum opening degree among the opening degrees of the usage-side expansion valves after the correction is used as the representative opening degree, the representative opening degree and the actual amounts of depressurization by the usage-side expansion valves can be made to have a nearly proportional relationship. Therefore, even if the usage units have different installation conditions, the opening degree of the heat-source-side expansion valve can be adjusted based on a value close to the actual amounts of depressurization by the usage-side expansion valves, and the amount of depressurization by the heat-source-side expansion valve can be regulated more accurately.

In the air conditioning apparatus according to the tenth aspect of the present invention, the opening degree of the heat-source-side expansion valve can be regulated even when there are a plurality of usage units and a plurality of usage-side expansion valves.

In the air conditioning apparatus according to the eleventh aspect of the present invention, by setting the opening degrees of the usage-side expansion valves to a predetermined opening degree in advance, the balance between the amounts of depressurization by the usage-side expansion valves and the amount of depressurization by the heat-source-side expansion valve can be set to an optimum.

In the air conditioning apparatus according to the twelfth aspect of the present invention, when the state of the refrigerant quantity in the refrigerant circuit is in a tendency of a surplus, the refrigerant in the liquid refrigerant communication tube can be put into a highly dense liquid state. Therefore, the quantity of refrigerant retained in the liquid refrigerant communication tube can be increased as much as possible, and operation is possible even when there is a surplus of refrigerant. When the state of the refrigerant quantity in the refrigerant circuit is in a tendency of an insufficiency, the refrigerant in the liquid refrigerant communication tube can be put into a gas-liquid two-phase state of low density. Therefore, the quantity of refrigerant retained in the liquid refrigerant communication tube can be reduced, the reduced amount can be retained in the usage-side heat exchangers, and operation is possible even when the refrigerant is insufficient.

DESCRIPTION OF EMBODIMENTS

The following is a description, made with reference to the drawings, of an embodiment of the air conditioning apparatus and the refrigerant quantity determination method according to the present invention.

(1) Configuration of Air Conditioning Apparatus

Figure 1:
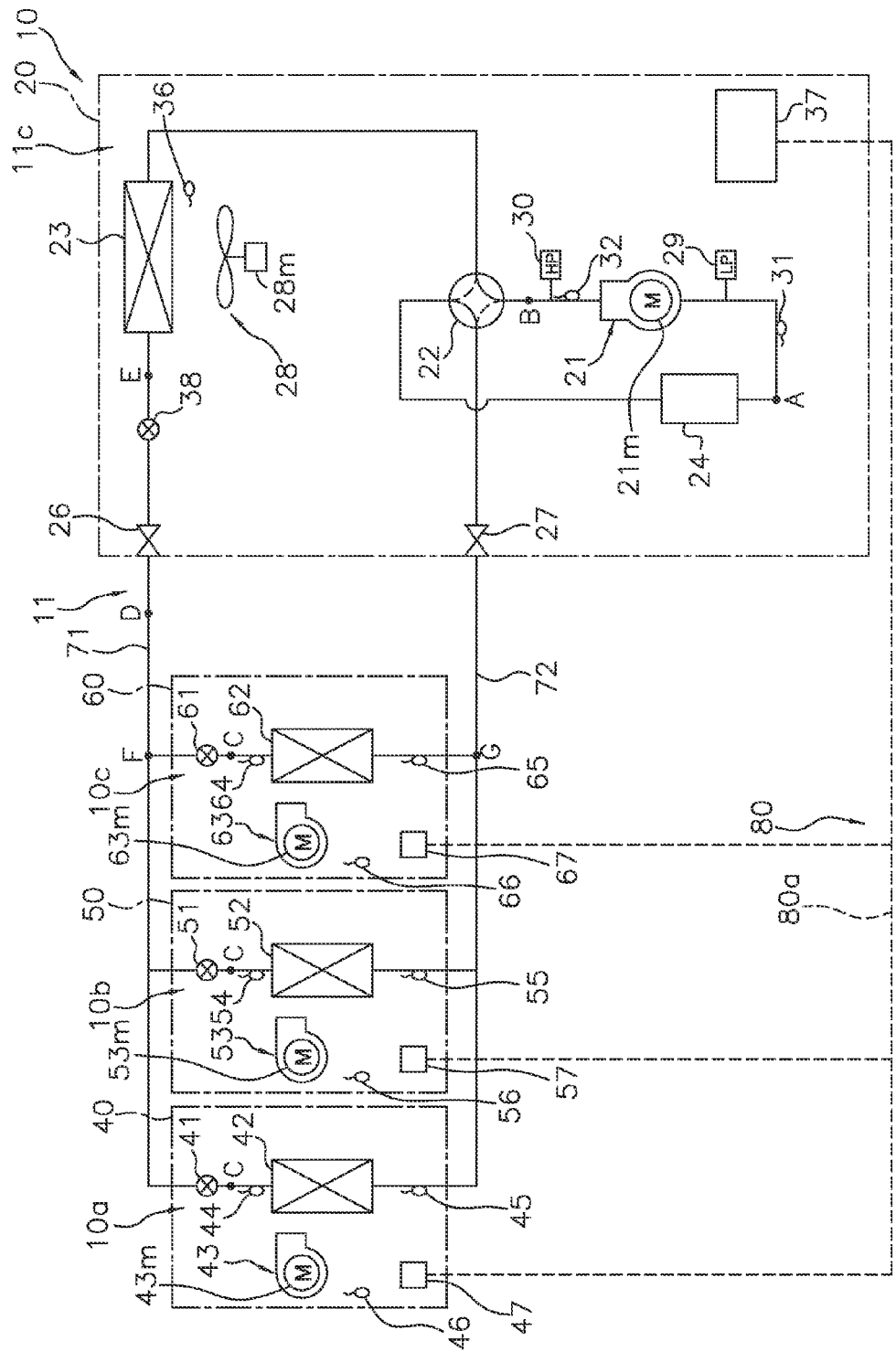
FIG. 1 is a schematic structural drawing of an air conditioning apparatus 10 according to an embodiment of the present invention.

FIG. 1 is a schematic structural drawing of an air conditioning apparatus 10 according to an embodiment of the present invention. The air conditioning apparatus 10 is an apparatus used to warm and cool the air inside a building or the like, by performing a vapor compression refrigeration cycle operation. The air conditioning apparatus 10 comprises primarily an outdoor unit 20 as a single heat source unit, indoor units 40, 50, 60 as a plurality of usage units (three in the present embodiment) connected in series to the outdoor unit, and a liquid refrigerant communication tube 71 and gas refrigerant communication tube 72 as refrigerant communication tubes connecting the outdoor unit 20 and the indoor units 40, 50, 60. Specifically, the vapor compression refrigerant circuit 11 of the air conditioning apparatus 10 of the present embodiment is configured by connecting the outdoor unit 20, the indoor units 40, 50, 60, the liquid refrigerant communication tube 71, and the gas refrigerant communication tube 72.

(1-1) Indoor Units

The indoor units 40, 50, 60 are installed by being embedded in or suspended from the ceiling of a room in a building or the like, or by being mounted on the wall of a room. The indoor units 40, 50, 60 are connected to the outdoor unit 20 via the liquid refrigerant communication tube 71 and the gas refrigerant communication tube 72, and the indoor units constitute part of the refrigerant circuit 11.

Next, the configurations of the indoor units 40, 50, 60 will be described. Since the indoor unit 40 has the same configuration as the indoor units 50, 60, only the configuration of the indoor unit 40 is described here, and for the configurations of the indoor units 50, 60, numerals in the fifties and sixties are used instead of numerals in the forties indicating the components of the indoor unit 40, and descriptions of these components are omitted.

The indoor unit 40 has primarily an indoor-side refrigerant circuit 11a constituting part of the refrigerant circuit 11 (the indoor unit 50 has an indoor-side refrigerant circuit 11b, and the indoor unit 60 has an indoor-side refrigerant circuit 11c). The indoor-side refrigerant circuit 11a has primarily an indoor expansion valve 41 as an expansion mechanism, and an indoor heat exchanger 42 as a usage-side heat exchanger. In the present embodiment, indoor expansion valves 41, 51, 61 are provided as expansion mechanisms to the indoor units 40, 50, 60, respectively, but this configuration is not the only possible option, and an expansion mechanism (including an expansion valve) may be provided to the outdoor unit 20, or the indoor units 40, 50, 60 and the outdoor unit 20 may be provided to independent connecting units.

In the present embodiment, the indoor expansion valve 41 is an electric expansion valve connected to the liquid side of the indoor heat exchanger 42 in order to perform operations such as regulating the flow rate of refrigerant flowing through the indoor-side refrigerant circuit 11a, and this valve is also capable of blocking the passage of refrigerant. In the present embodiment, when the opening degree of the indoor expansion valve 41 is set to the maximum, the valve has a maximum opening degree value at which the opening valve pulse reaches a maximum. In the present embodiment, when the indoor unit 40 is in the thermo-off state, the indoor expansion valve 41 is not fixed in the fully closed state but is regulated to an extremely small opening degree so as to ensure a refrigerant flow in order to prevent the liquid refrigerant from accumulating in the indoor heat exchanger. The term "extremely small opening degree" used herein refers to the opening valve pulse being set to a minimum predetermined value of a low opening degree that is not fully closed.

In the present embodiment, the indoor heat exchanger 42 is a cross fin type fin-and-tube heat exchanger configured from a heat transfer tube and numerous fins. This heat exchanger functions as an evaporator of refrigerant and cools indoor air during an air-cooling operation, and functions as a condenser of refrigerant and heats indoor air during an air-warming operation. In the present embodiment, the indoor heat exchanger 42 is a cross fin type fin-and-tube heat exchanger, but is not limited as such and may be another type of heat exchanger.

In the present embodiment, the indoor unit 40 has an indoor fan 43 as an air blower for drawing indoor air into the unit, and supplying the air into the room as supply air after the air has exchanged heat with the refrigerant in the indoor heat exchanger 42. The indoor fan 43 is a centrifugal fan, a multi-blade fan, or another type of fan driven by a motor 43m composed of a DC an motor or the like.

The indoor unit 40 is provided with various sensors. The liquid side of the indoor heat exchanger 42 is provided with a liquid-side temperature sensor 44 for detecting the refrigerant temperature (specifically, the refrigerant temperature corresponding to the refrigerant temperature Tsc of a subcooled state during the air-warming operation or the evaporation temperature Te during the air-cooling operation). Gas temperature sensors 45, 55, 65 for detecting the refrigerant temperature are provided to the gas side of the indoor heat exchanger 42. The side of the indoor unit 40 having an intake port for indoor air is provided with an indoor temperature sensor 46 for detecting the temperature of indoor air flowing into the unit (specifically, the indoor temperature Tr). In the present embodiment, the liquid-side temperature sensor 44, the gas temperature sensors 45, 55, 65, and the indoor temperature sensor 46 are composed of thermistors. The indoor unit 40 has an indoor-side controller 47 for controlling the actions of the components constituting the indoor unit 40. The indoor-side controller 47 has a microcomputer, a memory 47a, and/or the like provided for controlling the indoor unit 40, and the indoor-side controller 47 is capable of exchanging control signals and the like with a remote controller (not shown) for separately operating the indoor unit 40, and also of exchanging control signals and the like with the outdoor unit 20 via a transmission line 80a.

(1-2) Outdoor Unit

The outdoor unit 20 is installed on the outside of a building or the like, and is connected to the indoor units 40, 50, 60 via the liquid refrigerant communication tube 71 and the gas refrigerant communication tube 72, constituting the refrigerant circuit 11 together with the indoor units 40, 50, 60.

Next, the configuration of the outdoor unit 20 will be described. The outdoor unit 20 has primarily an outdoor-side refrigerant circuit 11d constituting part of the refrigerant circuit 11. The outdoor-side refrigerant circuit 11d has primarily a compressor 21, a four-way switching valve 22, an outdoor heat exchanger 23 as a heat-source-side heat exchanger, an outdoor expansion valve 38 as an expansion mechanism, an accumulator 24, a liquid-side shutoff valve 26, and a gas-side shutoff valve 27.

The compressor 21 is a compressor capable of varying operating capacity, and in the present embodiment is a positive displacement compressor driven by a motor 21m in which the rotational speed is controlled by an inverter. In the present embodiment, there is only one compressor 21, but the number of compressors is not limited as such and two or more compressors may be connected in series according to the number of connected indoor units and other factors.

The four-way switching valve 22 is a valve for switching the direction of refrigerant flow, and during the air-cooling operation, the four-way switching valve is capable of connecting the discharge side of the compressor 21 and the gas side of the outdoor heat exchanger 23 and also connecting the intake side of the compressor 21 (specifically, the accumulator 24) and the gas refrigerant communication tube 72 side, in order to make the outdoor heat exchanger 23 function as a condenser of the refrigerant compressed by the compressor 21 and to make the indoor heat exchangers 42, 52, 62 function as evaporators of the refrigerant condensed in the outdoor heat exchanger 23 (air-cooling operation state: see the solid lines of the four-way switching valve 22 in FIG. 1). During the air-warming operation, the four-way switching valve is capable of connecting the discharge side of the compressor 21 and the gas refrigerant communication tube 72 side and also connecting the intake side of the compressor 21 and the gas side of the outdoor heat exchanger 23, in order to make the indoor heat exchangers 42, 52, 62 function as condensers of the refrigerant compressed by the compressor 21 and to make the outdoor heat exchanger 23 function as an evaporator of the refrigerant condensed in the indoor heat exchangers 42, 52, 62 (air-warming operation state: see the dashed lines of the four-way switching valve 22 in FIG. 1).

In the present embodiment, the outdoor heat exchanger 23 is a cross fin type fin-and-tube heat exchanger, and is a device for using air as a heat source and conducting heat exchange with the refrigerant. The outdoor heat exchanger 23 is a heat exchanger that functions as a condenser of refrigerant during the air-cooling operation and that functions as an evaporator of refrigerant during the air-warming operation. The gas side of the outdoor heat exchanger 23 is connected to the four-way switching valve 22, and the liquid side is connected to the outdoor expansion valve 38. In the present embodiment, the outdoor heat exchanger 23 is a cross fin type fin-and-tube heat exchanger, but is not limited as such and may be another type of heat exchanger.

In the present embodiment, the outdoor expansion valve 38 is an electric expansion valve disposed downstream of the outdoor heat exchanger 23 (connected to the liquid side of the outdoor heat exchanger 23 in the present embodiment) in the direction of refrigerant flow in the refrigerant circuit 11 during the air-cooling operation, in order to regulate the pressure, flow rate, and/or other features of the refrigerant flowing through the outdoor-side refrigerant circuit 11d.

In the present embodiment, the outdoor unit 20 has an outdoor fan 28 as an air blower for drawing outdoor air into the room and expelling the air out of the room after the air has exchanged heat with the refrigerant in the outdoor heat exchanger 23. The outdoor fan 28 is a fan capable of varying the flow rate of air supplied to the outdoor heat exchanger 23, and in the present embodiment, the outdoor fan is a propeller fan or the like driven by a motor 28m composed of a DC fan motor or the like.

The liquid-side shutoff valve 26 and the gas-side shutoff valve 27 are valves provided to ports connecting with external equipment or tubing (specifically, the liquid refrigerant communication tube 71 and the gas refrigerant communication tube 72). The liquid-side shutoff valve 26 is disposed downstream of the outdoor expansion valve 38 and upstream of the liquid refrigerant communication tube 71 in the direction of refrigerant flow in the refrigerant circuit 11 during the air-cooling operation, and is also capable of blocking the passage of refrigerant. The gas-side shutoff valve 27 is connected to the four-way switching valve 22.

Figure 2:
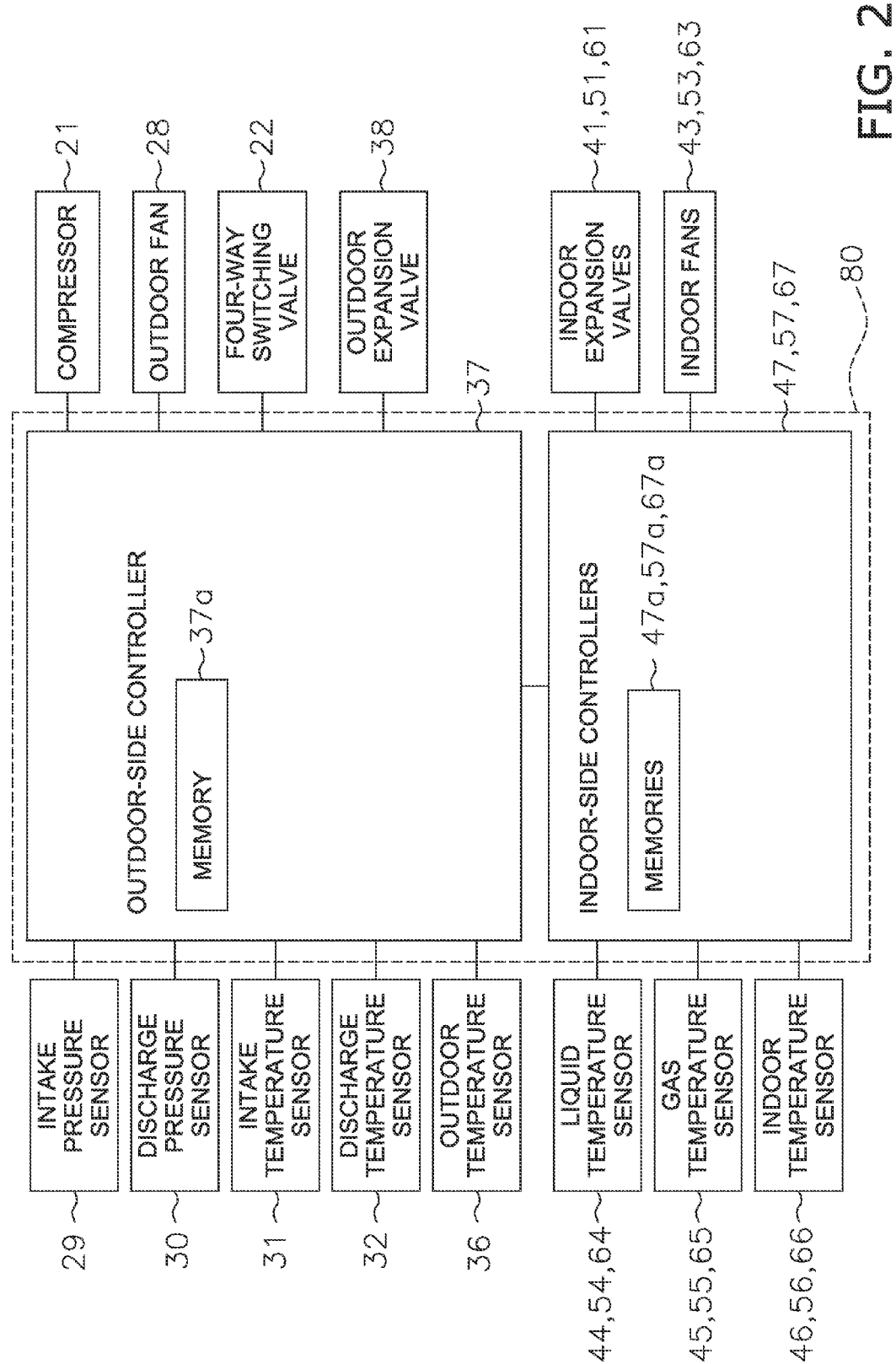
FIG. 2 is a control block diagram of the air conditioning apparatus 10.

The outdoor unit 20 is provided with various sensors. Specifically, the outdoor unit 20 is provided with an intake pressure sensor 29 for detecting the intake pressure of the compressor 21, a discharge pressure sensor 30 for detecting the discharge pressure of the compressor 21, an intake temperature sensor 31 for detecting the intake temperature of the compressor 21, and a discharge temperature sensor 32 for detecting the discharge temperature of the compressor 21. The side of the outdoor unit 20 having an intake port for outdoor air is provided with an outdoor temperature sensor 36 for detecting the temperature of outdoor air flowing into the unit (specifically, the outdoor temperature). In the present embodiment, the intake temperature sensor 31, the discharge temperature sensor 32, and the outdoor temperature sensor 36 are composed of thermistors. The outdoor unit 20 has an outdoor-side controller 37 for controlling the actions of the components constituting the outdoor unit 20. The outdoor-side controller 37 has a microcomputer provided for controlling the outdoor unit 20, a memory 37a, and/or an inverter circuit or the like for controlling the motor 21m, as shown in FIG. 2, and the outdoor-side controller is capable of exchanging control signals and the like with indoor-side controllers 47, 57, 67 of the indoor units 40, 50, 60 via the transmission line 80a. Specifically, an operation controller 80 for controlling the operations of the entire air conditioning apparatus 10 is configured by the transmission line 80a connecting the indoor-side controllers 47, 57, 67 and the outdoor-side controller 37.

The operation controller 80 is connected so as to be capable of receiving detection signals from the various sensor 29 to 32, 36, 39, 44 to 46, 54 to 56, and 64 to 66, and is connected so as to be capable of controlling the various devices and valves 21, 22, 28, 38, 41, 43, 51, 53, 61, 63 on the basis of these detection signals and the like, as shown in FIG. 2. Various data is stored in the memories 37a, 47a, 57a, 67a constituting the operation controller 80. FIG. 2 is a control block diagram of the air conditioning apparatus 10.

(1-3) Refrigerant Communication Tubes

The refrigerant communication tubes 71, 72 are refrigerant tubes constructed onsite when the air conditioning apparatus 10 is installed in a building or other installation location, and refrigerant communication tithes of various lengths and/or diameters are used according to the installation location, the combination of outdoor units and indoor units, and other installation conditions. Therefore, when an air conditioning apparatus is newly installed, for example, the air conditioning apparatus 10 must be filled with a quantity of refrigerant suitable for the lengths and diameters of the refrigerant communication tubes 71, 72 and other installation conditions.

As described above, the indoor-side refrigerant circuits 11a, 11b, 11c, the outdoor-side refrigerant circuit 11d, and the refrigerant communication tubes 71, 72 are connected to constitute the refrigerant circuit 11 of the air conditioning apparatus 10. In the air conditioning apparatus 10 of the present embodiment, the operation controller 80 configured from the indoor-side controllers 47, 57, 67 and the outdoor-side controller 37 performs the operation of switching between the air-cooling operation and the air-warming operation through the four-way switching valve 22, and also performs control of the various devices of the outdoor unit 20 and the indoor units 40, 50, 60 in accordance with the operation loads of the indoor units 40, 50, 60.

(2) Action of Air Conditioning Apparatus

Next, the action of the air conditioning apparatus 10 of the present embodiment will be described.

In the air conditioning apparatus 10, during the air-cooling operation and the air-warming operation described below, the indoor units 40, 50, 60 are subjected to indoor temperature optimization control for bringing the indoor temperature Tr near to a set temperature Ts that a user has set through a remote controller or another input device. In this indoor temperature optimization control, the opening degrees of the indoor expansion valves 41, 51, 61 are regulated on that the indoor temperature Tr converges on the set temperature Ts. The phrase "the opening degrees of the indoor expansion valves 41, 51, 61 are regulated" used herein means that the degrees of superheat of the outlets of the indoor heat exchangers 42, 52, 62 are controlled in the case of the air-cooling operation, and that the degrees of subcooling of the outlets of the indoor heat exchangers 42, 52, 62 are controlled in the case of the air-warming operation.

(2-1) Air-Cooling Operation

First, the air-cooling operation will be described using FIG. 1.

During the air-cooling operation, the four-way switching valve 22 is in the state shown by the solid lines of FIG. 1, i.e., the discharge side of the compressor 21 is connected to the gas side of the outdoor heat exchanger 23, and the intake side of the compressor 21 is connected to the gas sides of the indoor heat exchangers 42, 52, 62 via the gas-side shutoff valve 27 and the gas refrigerant communication tube 72. The outdoor expansion valve 38 is fully opened. The liquid-side shutoff valve 26 and the gas-side shutoff valve 27 are opened. The opening degrees of the indoor expansion valves 41, 51, 61 are regulated so that the degrees of superheat SH of the refrigerant in the outlets of the indoor heat exchangers 42, 52, 62 (i.e., the gas sides of the indoor heat exchangers 42, 52, 62) stabilize at a target degree of superheat SHt. The target degree of superheat SHt is set to a temperature value that is optimal in order for the indoor temperature Tr to converge on the set temperature Ts within a predetermined degree of superheat range. In the present embodiment, the degrees of superheat SH of the refrigerant in the outlets of the indoor heat exchangers 42, 52, 62 are detected by subtracting the refrigerant temperature values (corresponding to the evaporation temperature Te) detected by the liquid-side temperature sensors 44, 54, 64 from the refrigerant temperature values detected by the gas-side temperature sensors 45, 55, 65. The degrees of superheat SH of the refrigerant in the outlets of the indoor heat exchangers 42, 52, 62 are not limited to being detected by the method described above, and may be detected by converting the intake pressure of the compressor 21 detected by the intake pressure sensor 29 to a saturation temperature value corresponding to the evaporation temperature Te, and subtracting this refrigerant saturation temperature value from the refrigerant temperature values detected by the gas-side temperature sensors 45, 55, 65. Though not employed in the present embodiment, temperature sensors may be provided for detecting the temperatures of refrigerant flowing through each of the indoor heat exchangers 42, 52, 62, and the degrees of superheat SH of the refrigerant in the outlets of each of the indoor heat exchangers 42, 52, 62 may be detected by subtracting the refrigerant temperature values corresponding to the evaporation temperature Te detected by these temperature sensors from the refrigerant temperature values detected by the gas-side temperature sensors 45, 55, 65.

When the compressor 21, the outdoor fan 28, and the indoor fans 43, 53, 63 are operated with the refrigerant circuit 11 in this state, low-pressure gas refrigerant is drawn into the compressor 21 and compressed to high-pressure gas refrigerant. The high-pressure gas refrigerant is then sent through the four-way switching valve 22 to the outdoor heat exchanger 23, subjected to heat exchange with outdoor air supplied by the outdoor fan 28, and condensed to high-pressure liquid refrigerant. The high-pressure liquid refrigerant is sent through the liquid-side shutoff valve 26 and the liquid refrigerant communication tube 71 to the indoor units 40, 50, 60.

The high-pressure liquid refrigerant sent to the indoor units 40, 50, 60 is depressurized nearly to the intake pressure of the compressor 21 by the indoor expansion valves 41, 51, 61, becoming low-pressure gas-liquid two-phase refrigerant, which is sent to the indoor heat exchangers 42, 52, 62, subjected to heat exchange with indoor air in the indoor heat exchangers 42, 52, 62, and evaporated to low-pressure gas refrigerant.

This low-pressure gas refrigerant is sent through the gas refrigerant communication tube 72 to the outdoor unit 20, and the refrigerant flows through the gas-side shutoff valve 27 and the four-way switching valve 22 to the accumulator 24. The low-pressure gas refrigerant that has flowed to the accumulator 24 is again drawn into the compressor 21. Thus, in the air-conditioning apparatus 10, it is possible to at least perform the air-cooling operation in which the outdoor heat exchanger 23 is made to function as a condenser of refrigerant compressed in the compressor 21, and the indoor heat exchangers 42, 52, 62 are made to function as evaporators of refrigerant that has been condensed in the outdoor heat exchanger 23 and then sent through the liquid refrigerant communication tube 71 and the indoor expansion valves 41, 51, 61. Because the air-conditioning apparatus 10 has no mechanism for regulating the pressure of refrigerant in the gas sides of the indoor heat exchangers 42, 52, 62, the evaporation pressures Pe in all of the indoor heat exchangers 42, 52, 62 are the same pressure.

(2-2) Air-Warming Operation

Next, the air-warming operation will be described.

During the air-warming operation, the four-way switching valve 22 is in the state shown by the dashed lines in FIG. 1 (the air-warming operation state), i.e., the discharge side of the compressor 21 is connected to the gas sides of the indoor heat exchangers 42, 52, 62 via the gas-side shutoff valve 27 and the gas refrigerant communication tube 72, and the intake side of the compressor 21 is connected to the gas side of the outdoor heat exchanger 23. The opening degree of the outdoor expansion valve 38 is regulated in order to reduce the pressure to a pressure at which the refrigerant flowing into the outdoor heat exchanger 23 can be evaporated in the outdoor heat exchanger 23 (i.e. an evaporation pressure Pe). The liquid-side shutoff valve 26 and the gas-side shutoff valve 27 are opened. The opening degrees of the indoor expansion valves 41, 51, 61 are regulated so that the degrees of subcooling SC of the refrigerant in the outlets of the indoor heat exchangers 42, 52, 62 stabilize at a target degree of subcooling SCt. The target degree of subcooling SCt is set to the optimal temperature value in order to make the indoor temperature Tr converge on the set temperature Ts within the degree of subcooling range specified according to the operating state at the time. In the present embodiment, the degrees of subcooling SC of the refrigerant in the outlets of the indoor heat exchangers 42, 52, 62 are detected by converting the discharge pressure Pd of the compressor 21 detected by the discharge pressure sensor 30 to a saturation temperature value corresponding to the condensation temperature Tc, and subtracting the refrigerant temperatures Tsc detected by the liquid-side temperature sensors 44, 54, 64 from this refrigerant saturation temperature value. Though not used in the present embodiment, temperature sensors may be provided for detecting the temperature of refrigerant flowing through each of the indoor heat exchangers 42, 52, 62, and the degrees of subcooling SC of refrigerant in the outlets of the indoor heat exchangers 42, 52, 62 may be detected by subtracting the refrigerant temperature values corresponding to the condensation temperature Tc detected by these temperature sensors from the refrigerant temperatures Tsc detected by the liquid-side temperature sensors 44, 54, 64.

When the compressor 21, the outdoor fan 28, and the indoor fans 43, 53, 63 are operated with the refrigerant circuit 11 in this state, low-pressure gas refrigerant is drawn into the compressor 21 and compressed to high-pressure gas refrigerant, which is sent through the four-way switching valve 22, the gas-side shutoff valve 27, and the gas refrigerant communication tube 72 to the indoor units 40, 50, 60.

The high-pressure gas refrigerant sent to the indoor units 40, 50, 60 is subjected to heat exchange with indoor air in the indoor heat exchangers 42, 52, 62 and condensed to high-pressure liquid refrigerant, and when this refrigerant then passes through the indoor expansion valves 41, 51, 61, the refrigerant is depressurized according to the valve opening degrees of the indoor expansion valves 41, 51, 61.

Having passed through the indoor expansion valves 41, 51, 61, the refrigerant is sent through the liquid refrigerant communication tube 71 to the outdoor unit 20, passed through the liquid-side shutoff valve 26 and the outdoor expansion valve 38, and further depressurized, after which the refrigerant flows into the outdoor heat exchanger 23. The low-pressure gas-liquid two-phase refrigerant flowing into the outdoor heat exchanger 23 is subjected to heat exchange with outdoor air supplied by the outdoor fan 28 and evaporated to low-pressure gas refrigerant, which flows through the four-way switching valve 22 into the accumulator 24. The low-pressure gas refrigerant flowing into the accumulator 24 is again drawn into the compressor 21.

(2-3) Expansion Valve Correlation Control

In the air conditioning apparatus 10, during the air-warming operation, the operation controller 80 performs expansion valve correlation control for regulating the opening degree of the outdoor expansion valve 38 on the basis of a representative opening degree of the indoor expansion valves 41, 51, 61. The operation controller 80 employs as the representative opening degree of the indoor expansion valves 41, 51, 61 an indoor expansion valve opening degree that is the maximum opening degree among the opening degrees of the indoor expansion valves 41, 51, 61 (hereinbelow referred to as the employed expansion valve opening degree). In the air conditioning apparatus 10 of the present embodiment, the operation controller 80 regulates the opening degree of the outdoor expansion valve 38 so that the amount of depressurization by the indoor expansion valves at the maximum opening degree among the opening degrees of the indoor expansion valves 41, 51, 61 is sufficient for the liquid phase to be maintained even after depressurization, e.g. 0.2 MPa (a target predetermined value of the opening valve pulse set corresponding to an amount of depressurization of 0.2 MPa). At this time, the opening degrees of the indoor expansion valves 41, 51, 61 are regulated so that the degrees of subcooling SC of the refrigerant in the outlets of the indoor heat exchangers 42, 52, 62 stabilize at the target degree of subcooling Sct as described above. Specifically, the opening degrees of the all expansion valves 38, 41, 51, 61 are regulated so that the amount of depressurization in each of the indoor expansion valves 41, 51, 61 stabilizes at 0.2 MPa and the degrees of subcooling SC of the refrigerant in the outlets of the indoor heat exchangers 42, 52, 62 stabilize at the target degree of subcooling SCt.

Figure 3:
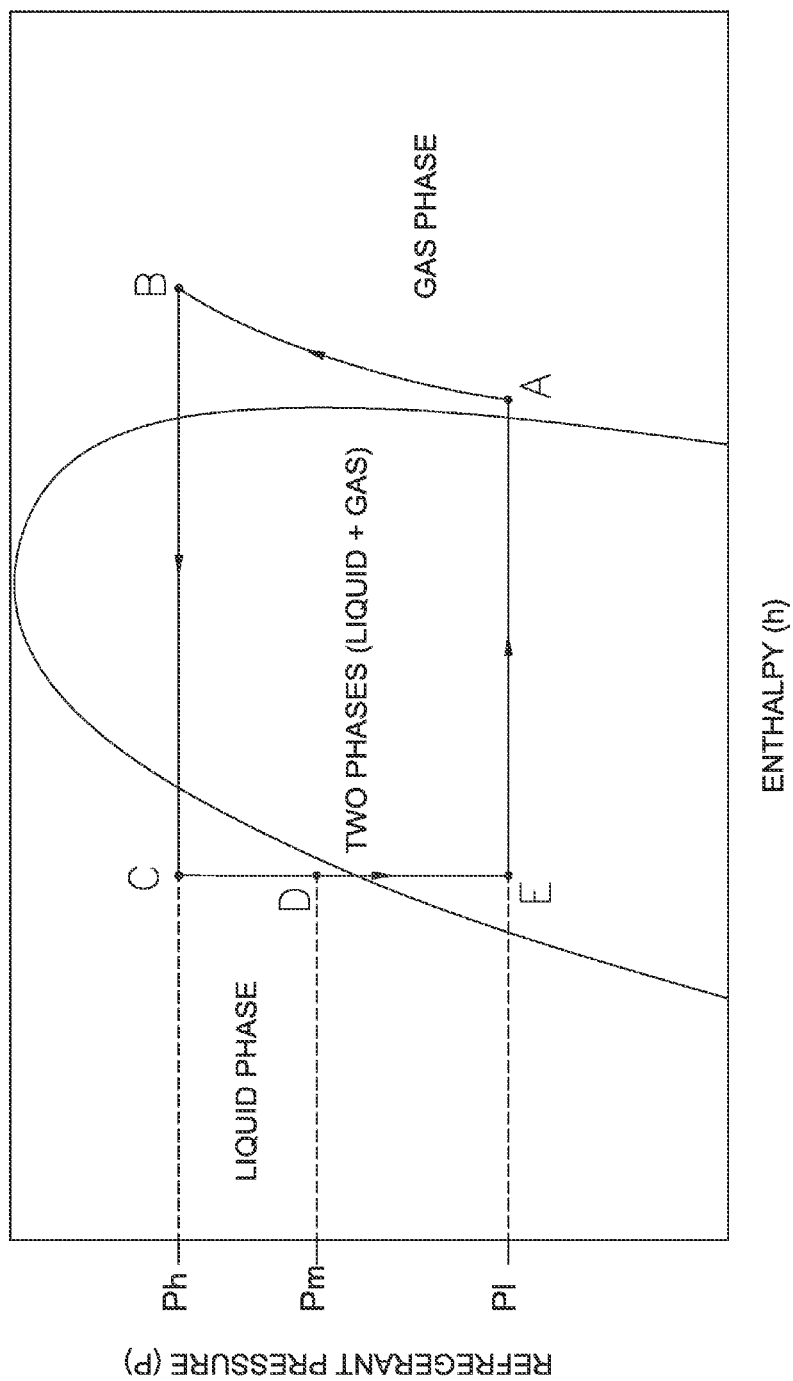
FIG. 3 is a p-h graph (a Mollier diagram) of the refrigeration cycle of a refrigerant circuit 11.

Next, the refrigeration cycle in the air conditioning apparatus 10 will be described. FIG. 3 uses a p-h graph (a Mollier diagram) to show the refrigeration cycle in the refrigerant circuit 11 of the air conditioning apparatus 10 of the present embodiment. The points A, B, C, D, and E in FIG. 3 represent states of the refrigerant corresponding to the respective points in FIG. 1 during the air-warming operation.

In this refrigerant circuit 11, the refrigerant is compressed by the compressor 21 to a high temperature and high pressure Ph (A→B). The gas refrigerant compressed by the compressor 21 to a high temperature and high pressure Ph is made to release heat by the outdoor heat exchanger 23 functioning as a condenser, becoming a liquid refrigerant of low temperature and high pressure Ph (B→C). Having released heat in the outdoor heat exchanger 23, the refrigerant is depressurized by the indoor expansion valves 41, 51, 61 from a high pressure Ph to an intermediate pressure Pm (C→D). The amount of depressurization by the indoor expansion valves 41, 51, 61 at this time is set to 0.2 MPa, and the refrigerant at point D is in a liquid phase as shown in FIG. 3. Specifically, the liquid refrigerant communication tube 71 from the indoor expansion valves 41, 51, 61 to the outdoor expansion valve 38 can be filled with liquid refrigerant. The refrigerant depressurized to the intermediate pressure Pm flows into the outdoor unit 20 where it is depressurized by the outdoor expansion valve 38 from the intermediate pressure Pm to a low pressure Pl, becoming a gas-liquid two-phase refrigerant (D→E). The heat of the gas-liquid two-phase refrigerant is absorbed in the outdoor heat exchanger 23 functioning as an evaporator, and the refrigerant evaporates and returns to the compressor 21 (E→A).

(3) Characteristics (3-1)

In the air conditioning apparatus 10 of the present embodiment, the representative opening degree of the indoor expansion valves 41, 51, 61 is controlled so that the opening valve pulse, which is a predetermined opening degree, reaches a target predetermined value, whereby the opening degree of the outdoor expansion valve 38 is regulated so that the amount of depressurization by the indoor expansion valves 41, 51, 61 is sufficient for the liquid phase to be maintained even after depressurization, e.g., 0.2 MPa.

Therefore, the amount of depressurization by the outdoor expansion valve 38 can be prevented from decreasing severely, and the refrigerant inside the liquid refrigerant communication tube 71 can be prevented from going into a gas-liquid two-phase state. Therefore, a surplus of refrigerant in the refrigerant circuit 11 can be prevented, and wet compression can be prevented from occurring in the compressor 21.

Balance between the amount of depressurization by the indoor expansion valves 41, 51, 61 and the amount of depressurization by the outdoor expansion valve 38 is achieved by regulating the opening degree of the outdoor expansion valve 38 so that the representative opening degree in the indoor expansion valves 41, 51, 61 stabilizes, and the intermediate pressure Pm can therefore be regulated without adding a pressure sensor or the like for detecting the intermediate pressure Pm between the indoor expansion valves 41, 51, 61 and the outdoor expansion valve 38, for example.

(3-2)

In the air conditioning apparatus 10 of the present embodiment, there are a plurality of indoor units 40, 50, 60. The operation controller 80 of the air conditioning apparatus 10 employs the maximum opening degree in the indoor expansion valves 41, 51, 61 as the representative opening degree. For example, when the indoor units 40, 50, 60 are in the thereto-off state, the opening degrees of the indoor expansion valves 41, 51, 61 are set to an extremely small opening degree whereby the opening valve pulse is the minimum predetermined value. Even in such cases, in the air conditioning apparatus 10, the amount of depressurization by the outdoor expansion valve 38 is regulated based on the amount of depressurization by the indoor expansion valves 41, 51, 61.

There can be cases in which the indoor unit 40 has a small required load and goes into the thereto-off state, the opening degree of the indoor expansion valve 41 is extremely small, and the required load of the indoor unit 50 is large, such as exhibiting 100% of the design capacity, for example. Even in such cases, the indoor-side controllers 47, 57, 67 employ the maximum opening degree in the indoor expansion valves 41, 51, 61 as the representative opening degree and regulate the opening degree of the outdoor expansion valve 38 on the basis of the representative opening degree. Therefore, among the amounts of depressurization by the indoor expansion valves 41, 51, 61 and by the outdoor expansion valve 38, an amount of depressurization of 0.2 MPa can be ensured as the amount of depressurization by the indoor expansion valves 41, 51, 61. Specifically, the amount of depressurization by the indoor expansion valves 41, 51, 61 can be prevented from being set to an extremely small amount of depressurization. The opening degree of the indoor expansion valve 41 of the indoor unit 40 requiring a small load and the opening degree of the indoor expansion valve 51 of the indoor unit 50 requiring a large load can each be set to a specific ratio suited to the respective required load. Specifically, the refrigerant quantity flowing to a usage unit requiring a small load and the refrigerant quantity flowing to a usage unit requiring a large load can be set to a ratio suited to the required loads. Consequently, an excessive quantity of refrigerant can be prevented from flowing to a usage unit requiring a small load, and energy can be conserved.

(3-3)

In the air conditioning apparatus 10 of the present embodiment, the outdoor unit 20 has an accumulator 24 on the intake side of the compressor 21.

Therefore, any surplus of refrigerant occurring in the refrigerant circuit 11 depending on the operating conditions can be accumulated in the accumulator 24. Therefore, liquid compression can be prevented from occurring in the compressor 21.

(4) Modifications (4-1) Modification 1

In the air conditioning apparatus 10 of the embodiment described above, the maximum opening degree among the opening degrees of the indoor expansion valves 41, 51, 61 is employed as the representative opening degree, but to employ a more accurate value as the representative opening degree, another possible option is that the opening degrees of the indoor expansion valves 41, 51, 61 be corrected based on the specifications of the indoor units, and the maximum opening degree among the opening degrees after this correction (the corrected opening degrees) be employed as the representative opening degree. The term "specifications of the indoor units" used herein refers to the ratio between a specific flow rate based on the flow rate of refrigerant needed to achieve the rated capacity of the indoor units 40, 50, 60 under predetermined conditions, and the aperture of the indoor expansion valve 41 of the indoor unit 40. Specifically, when the specific flow rate of the indoor unit 40 is 1, the indoor unit 40 can be regarded as exhibiting 100% of its rated capacity, and when the specific flow rate of the indoor unit 40 is 0.6, the indoor unit 40 can be regarded as exhibiting 60% of its rated capacity.

More specifically, the opening degree of the correction (hereinbelow the corrected opening degree) is a value obtained by dividing the opening degree of the indoor expansion valve 41 detected at the time by the opening degree of the indoor expansion valve 41 at which the specific flow rate is 1 and the amount of depressurization is 0.2 MPa. For the sake of convenience in the description, only the indoor unit 40 is described herein, but the same description applies to the indoor units 50, 60.

In this case, specification data of the indoor units 40, 50, 60 is stored in the memories 47a, 57a, 67a of the indoor-side controllers, and the corrections of the opening degrees of the indoor expansion valves 41, 51, 61 are performed by the indoor-side controllers 47, 57, 67. The corrections of the opening degrees of the indoor expansion valves 41, 51, 61 are not limited as such, however, and may be performed by the outdoor-side controller 37.

Thus, because the opening degrees of the indoor expansion valves 41, 51, 61 are corrected based on the specifications of the indoor units 40, 50, 60, the corrected opening degrees and the actual amounts of depressurization of the usage-side expansion valves can be made to approach a proportional relationship. Therefore, even if the usage units have different specifications, the opening degree of the heat-source-side expansion valve can be regulated based on a value close to the actual amounts of depressurization of the usage-side expansion valves, and the amount of depressurization by the heat-source-side heat exchanger can be regulated more accurately.

(4-2) Modification 2

In the air conditioning apparatus 10 of the embodiment described above, the maximum opening degree among the opening degrees of the indoor expansion valves 41, 51, 61 is employed as the representative opening degree, but to employ a more accurate value as the representative opening degree, another possible option is that the opening degrees of the indoor expansion valves 41, 51, 61 be corrected based on the installation conditions of the indoor units, and the maximum opening degree among the opening degrees after this correction (the corrected opening degrees) be employed as the representative opening degree. The term "installation conditions of the indoor units" used herein refers to the tube lengths and tube diameters of the refrigerant communication tubes 71, 72 from the outdoor unit 20 to the indoor units 40, 50, 60.

More specifically, the opening degree of the correction (hereinbelow the corrected opening degree) is a value obtained by dividing the opening degree of the indoor expansion valve 41 detected at the time by the opening degree of the indoor expansion valve 41 at which the specific flow rate is 1 and the amount of depressurization is 0.2 MPa, taking into account pressure loss in the refrigerant communication tubes from the outdoor unit 20 to the indoor unit 40. For example, there could be a case in which the specific flow rate is 1, the pressure loss in the refrigerant communication tubes 71, 72 from the outdoor unit 20 to the indoor unit 40 is 0.10 MPa, and the pressure loss in the refrigerant communication tubes 71, 72 from the outdoor unit 20 to the indoor unit 60 is 0.02 MPa. In the indoor unit 40, because the pressure loss in the refrigerant communication tubes 71, 72 is 0.10 MPa, the opening degree is corrected to an opening degree corresponding to 0.1 MPa, which is 0.1 MPa subtracted from 0.2 MPa, for the amount of depressurization in the indoor unit 40 to be 0.2 MPa including the refrigerant communication tubes 71, 72 from the outdoor unit 20 to the indoor unit 40. In the indoor unit 60, because the pressure loss in the refrigerant communication tubes 71, 72 is 0.02 MPa, the opening degree is corrected to an opening degree corresponding to 0.18 MPa, which is 0.02 MPa subtracted from 0.2 MPa, for the amount of depressurization in the indoor unit 60 to be 0.2 MPa including the refrigerant communication tubes 71, 72 from the outdoor unit 20 to the indoor unit 60. By correcting the opening degrees of each of the indoor expansion valves in this manner, the opening degrees of the indoor expansion valves can be regulated so that the amount of depressurization will actually be 0.2 MPa.

For the sake of convenience in the description, only the indoor unit 40 is described herein, but the same description applies to the indoor units 50, 60. The refrigerant communication tubes from the outdoor unit 20 to the indoor unit 40 are taken into account herein, but this is not the only possible option, and another option is to take into account the parts of the refrigerant communication tubes 71, 72 that start at the branching points F, G (see FIG. 1) and end at the indoor units 40, 50, 60, these branching points being where the refrigerant communication tubes 71, 72 branch to the indoor unit 60, which is the indoor unit nearest to the outdoor unit 20. The correction of the opening degrees of the indoor expansion valves 41, 51, 61 in Modification 2 may be used together with the correction of Modification 1.

Thus, because the opening degrees of the indoor expansion valves 41, 51, 61 are corrected based on the installation conditions of the indoor units 40, 50, 60, the corrected opening degree and the actual amounts of depressurization of the usage-side expansion valves can be made to approach a proportional relationship. Therefore, even if the usage units have different specifications, the opening degree of the heat-source-side expansion valve can be regulated based on a value close to the actual amounts of depressurization of the usage-side expansion valves, and the amount of depressurization by the heat-source-side heat exchanger can be regulated more accurately.

(4-3) Modification 3

In the air conditioning apparatus 10 of the embodiment described above, the indoor expansion valves 41, 51, 61 are not fixed in the fully closed state, but are regulated to extremely small opening degrees so as to ensure a refrigerant flow in order to prevent the liquid refrigerant from accumulating in the indoor heat exchangers, but the opening degrees of the indoor expansion valves 41, 51, 61 are not limited to being regulated to extremely small opening degrees. For example, refrigerant flow may be ensured by performing a control for intermittently fully closing and opening the indoor expansion valves 41, 51, 61 repeatedly.

(4-4) Modification 4

In the air conditioning apparatus 10 of the embodiment described above, the opening degrees of the indoor expansion valves 41, 51, 61 are set so that the opening valve pulses reach the target predetermined value, which is a fixed value, in order to bring the amounts of depressurization by the indoor expansion valves 41, 51, 61 to 0.2 MPa, but the opening degrees of the indoor expansion valves 41, 51, 61 are not limited to this option, and may be corrected based on the outside air temperature.

(4-5) Modification 5

In the air conditioning apparatus 10 of the embodiment described above, the maximum opening degree among the opening degrees of the indoor expansion valves 41, 51, 61 is employed as the representative opening degree, hut the representative opening degree is not limited to this option, and the average opening degree of the indoor expansion valves 41, 51, 61 may be employed as the representative opening degree.

(4-6) Modification 6

In the air conditioning apparatus 10 of the embodiment described above, though not implicitly stated, the target value of the representative opening degree of the indoor expansion valves 41, 51, 61, which is used as a basis when the opening degree of the outdoor expansion valve 38 is regulated, may be caused to fluctuate by the operation controller 80 in accordance with the state of the refrigerant in the refrigerant circuit 11, such as there tending to be a surplus or an insufficiency (the state of the system refrigerant quantity). Specifically, when the state of the system refrigerant quantity in the refrigerant circuit 11 is a tendency of a surplus, the response is to increase the target value of the representative opening degree of the indoor expansion valves 41, 51, 61 based on the opening degree control of the outdoor expansion valve 38, and when the state of the system refrigerant quantity in the refrigerant circuit 11 is a tendency, of an insufficiency, the response is to reduce the target value of the representative opening degree of the indoor expansion valves 41, 51, 61 based on the opening degree control of the outdoor expansion valve 38.

Such control makes it possible to put the refrigerant in the liquid refrigerant communication tube 71 into a liquid state of high density when the state of the refrigerant quantity in the refrigerant circuit 11 is a tendency to be a surplus. Therefore, the quantity of refrigerant retained in the liquid refrigerant communication tube 71 can be increased as much as possible, and operation is possible even when there is a surplus of refrigerant.

When the state of the refrigerant quantity in the refrigerant circuit 11 is a tendency to be an insufficiency, the refrigerant in the liquid refrigerant communication tube 71 can be put into a gas-liquid two-phase state of low density. Therefore, the quantity of refrigerant retained in the liquid refrigerant communication tube 71 can be reduced, the reduced amount can be retained in the usage-side heat exchangers, and operation is possible even when there is insufficient refrigerant.

What is claimed is:

1. An air conditioning apparatus, comprising:
   a heat source unit having a compression mechanism, a heat-source-side heat exchanger operable at least as an evaporator, an accumulator on an intake side of the compression mechanism, and a heat-source-side expansion valve;
   a plurality of usage units having usage-side heat exchangers operable at least as condensers, and usage-side expansion valves; and
   a controller configured
      to regulate an opening degree of the heat-source-side expansion valve based on opening degrees of the usage-side expansion valves, to set a degree of subcooling target value for each of the usage units in accordance with a required load of each of the usage units, and to regulate the opening degree of the heat-source-side expansion valve based on a representative opening degree of the usage-side expansion valves of die usage units so that an amount of depressurization by a usage-side expansion valve at the representative opening degree maintains refrigerant upstream of the heat-source-side expansion valve in a liquid phase.

2. The air conditioning apparatus according to claim 1, wherein
the controller is further configured to regulate usage-side expansion valves when the usage units are in a thermo-off state so that the valves are not fixed in a fully closed state and a flow of refrigerant is ensured.

3. The air conditioning apparatus according to claim 1, wherein
the controller is further configured to use a maximum opening degree of the opening degrees of the usage-side expansion valves of the usage units as the representative opening degree.

4. The air conditioning apparatus according to claim 3, wherein
the controller is further configured
to correct the opening degree of the usage-side expansion valve of each of the usage units based on specifications of the usage unit having the usage-side expansion valve, and
to use the maximum opening degree of the opening degrees of the usage-side expansion valves as the representative opening degree after correction of the opening degrees in the usage units.

5. The air conditioning apparatus according to claim 3, wherein
the controller is further configured
to correct the opening degree of the usage-side expansion valve of each of the usage units based on installation conditions of the usage unit to which the usage-side expansion valve belongs, and
to use the maximum opening degree of the opening degrees of the usage-side expansion valves as the representative opening degree after correction of the opening degrees in the usage units.

6. The air conditioning apparatus according to claim 1, wherein
the controller is further configured to use an average opening degree of the usage-side expansion valves of the usage a its as the representative opening degree.

7. The air conditioning apparatus according to claim 1, wherein
the controller is further configured to cause a target value of the opening degrees of the usage-side expansion valves to fluctuate in accordance with a system refrigerant quantity state estimated from an operating state, the target value being a reference used to regulate the opening degree of the heat-source-side expansion valve.

8. The air conditioning apparatus according to claim 1, wherein
the controller is further configured to regulate the opening degree of the usage-side expansion valves during an air-warming operation so that a degree of subcooling in outlets of the usage-side heat exchangers reaches a degree of subcooling target value.

9. The air conditioning apparatus according to claim 8, wherein
the controller sets the degree of subcooling target value for each of the usage units in accordance with a required load of each of the usage units.

10. The air conditioning apparatus according to claim 9, wherein
the controller is further configured to regulate the usage-side expansion valves when the usage units are in a thermo-off state so that the valves are not fixed in a fully closed state and a flow of refrigerant is ensured.

11. The air conditioning apparatus according to claim 9, wherein
the controller is further configured to regulate the opening degree of the heat-source-side expansion valve based on a representative opening degree of the usage-side expansion valves of the usage units.

12. The air conditioning apparatus according to claim 11, wherein
the controller is further configured to use a maximum opening degree of the opening degrees of the usage-side expansion valves of the usage units as the representative opening degree.

13. The air conditioning apparatus according to claim 12, wherein
the controller is further configured
to correct the opening degree of the usage-side expansion valve of each of the usage units based on specifications of the usage unit having the usage-side expansion valve, and
to use the maximum opening degree of the opening degrees of the usage-side expansion valves as the representative opening degree after correction of the opening degrees in the usage units.

14. The air conditioning apparatus according to claim 12, wherein
the controller is further configured
to correct the opening degree of the usage-side expansion valve of each of the usage units based on installation conditions of the usage unit to which the usage-side expansion valve belongs, and
to use the maximum opening degree of the opening degrees of the usage-side expansion valves as the representative opening degree after correction of the opening degrees in the usage units.

15. The air conditioning apparatus according to claim 1, wherein
the controller is further configured to cause the target value of the opening degrees of the usage-side expansion valves to fluctuate in accordance with a system refrigerant quantity state estimated from an operating state, the target value being a reference used to regulate the opening degree of the heat-source-side expansion valve.

* * * * *